US007457842B2

(12) United States Patent  (10) Patent No.: US 7,457,842 B2
Heilmann  (45) Date of Patent: Nov. 25, 2008

(54) METHOD, SYSTEM, AND COMPUTER PROGRAM PRODUCT FOR ALERTING AN EMAIL USER PRIOR TO THE SUBSEQUENT DISTRIBUTION OF A RECEIVED BLIND CARBON-COPIED EMAIL MESSAGE

(75) Inventor: Keith W. Heilmann, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 846 days.

(21) Appl. No.: 10/732,034

(22) Filed: Dec. 10, 2003

(65) Prior Publication Data

US 2005/0132066 A1  Jun. 16, 2005

(51) Int. Cl.
*G06F 15/16* (2006.01)

(52) U.S. Cl. ...................... 709/206; 709/207

(58) Field of Classification Search .......... 709/204–207
See application file for complete search history.

(56) References Cited

U.S. PATENT DOCUMENTS

| | | | | |
|---|---|---|---|---|
| 5,630,060 | A * | 5/1997 | Tang et al. | 709/238 |
| 5,864,848 | A * | 1/1999 | Horvitz et al. | 707/6 |
| 5,958,005 | A * | 9/1999 | Thorne et al. | 709/202 |
| 5,978,566 | A * | 11/1999 | Plank et al. | 709/206 |
| 6,057,841 | A * | 5/2000 | Thurlow et al. | 715/809 |
| 6,460,074 | B1 * | 10/2002 | Fishkin | 709/206 |
| 6,721,784 | B1 * | 4/2004 | Leonard et al. | 709/206 |
| 6,904,521 | B1 * | 6/2005 | Jivsov | 713/155 |
| 7,076,533 | B1 * | 7/2006 | Knox et al. | 709/217 |
| 7,130,887 | B2 * | 10/2006 | Goldberg | 709/206 |
| 2002/0042815 | A1 * | 4/2002 | Salzfass et al. | 709/206 |
| 2002/0078158 | A1 * | 6/2002 | Brown et al. | 709/206 |
| 2002/0120699 | A1 * | 8/2002 | Wakabayashi | 709/206 |
| 2003/0200263 | A1 * | 10/2003 | Goldberg | 709/206 |
| 2003/0233410 | A1 * | 12/2003 | Gusler et al. | 709/206 |
| 2004/0221012 | A1 * | 11/2004 | Heumesser | 709/206 |
| 2005/0018237 | A1 * | 1/2005 | Cossel et al. | 358/1.15 |
| 2005/0135681 | A1 * | 6/2005 | Schirmer | 382/229 |

OTHER PUBLICATIONS

Gordon Padwick et al., Special Edition using Microsoft Outlook 2000, May 1999, Que, pp. 617-639.*
Herb Tyson, Sams Teach Yourself Microsoft Outlook 2000 in 24 Hours, May 1999, Sams, pp. 222-233.*

* cited by examiner

*Primary Examiner*—Nathan J. Flynn
*Assistant Examiner*—David E England
(74) *Attorney, Agent, or Firm*—Ayla A. Lari; Hoffman Warnick LLC

(57) ABSTRACT

Under the present invention, a method, system, and program product for alerting an email user prior to any subsequent distribution of a received blind carbon-copied (BCC) email message is provided. The method includes: determining if the user attempts to further distribute the received BCC email message; and alerting the user that the user is attempting to further distribute the received BCC email message.

17 Claims, 4 Drawing Sheets

METHOD, SYSTEM, AND COMPUTER PROGRAM PRODUCT FOR ALERTING AN EMAIL USER PRIOR TO THE SUBSEQUENT DISTRIBUTION OF A RECEIVED BLIND CARBON-COPIED EMAIL MESSAGE

BACKGROUND OF THE INVENTION

1. Field of the Invention

The present invention generally relates to electronic mail (email). More specifically, the present invention provides a method, system, and computer program product for alerting an email user prior to any subsequent distribution of a received blind carbon-copied email message.

2. Background Art

As the use of computer technology continues to expand, computer users are increasingly communicating with each other in a network environment (e.g., over the Internet). One popular form of such communication is electronic mail (email). Email networks permit a network of communicating users to transmit documents (e.g. text, graphics, facsimile, voice, etc.) from one user to another.

Many different types of email systems exist today. Most of these systems provide a user with the ability to designate one or more primary recipients through a "TO" field and one or more secondary recipients through a "CC" or carbon-copy field. Commonly, the email addresses/names of all recipients designated through the use of TO and CC fields are identified to all other recipients of the email message. For example, if user1@email.com is designated as a TO recipient and user2@email.com is designated as a CC recipient, both user1 and user2 will be able to determine that the other was also sent the same email message. FIG. 1 illustrates an example of an email interface 10 that includes a TO field 12 and a CC field 14. The email interface 10 illustrated in FIG. 1 also includes a subject field 16 in which the subject of the email message is entered, and a text field 18 in which the text of the email message is entered. This type of email interface 10 is well known in the art and will not be described in further detail.

To provide some privacy, many email systems allow a composer (i.e., that person generating an email message) to designate one or more non-disclosed recipients through a "BCC" or blind carbon-copy field. The email interface 10 shown in FIG. 1 includes such a BCC field 20. Extending the above example, if user1@email.com is designated as a TO recipient, user2@email.com is designated as a CC recipient, and user3@email.com is designated as a BCC recipient, user3 will receive a copy of the associated electronic mail message, but will not be displayed in the message header of the TO and CC designated recipients. Accordingly, the BCC function may be used to route an email message to a third party without alerting other recipients that this is being done.

The BCC field 20 is often used to surreptitiously provide a copy of an email message to one or more "hidden" recipients without informing the recipients listed in the TO and CC fields 12, 14 that anyone else is privy to the email message. As an example, assume that an employee in a business has sent an email message containing personal company information to a co-worker, with the co-worker designated in the TO field 12 and the employee's manager designated in the BCC field 20. Also assume that it was the employee's intention that the email message not be further distributed (e.g., forwarded, replied to, copied, printed, and/or saved, etc.) by the BCC'd manager after being read. The manager, however, may not realize that he/she was a BCC recipient of the email message, and may inadvertently forward the email message to other employees, thereby unknowingly breaking a trust between the original sender of the email message and themselves, and between the employee and the co-worker. Unfortunately, currently available email systems/programs do not provide any means for alerting a user when they attempt to further distribute a BCC email message.

In view of the foregoing, there exists a need for a method, system, and program product for alerting an email user prior to any subsequent distribution of a received blind carbon-copied (BCC) email message.

SUMMARY OF THE INVENTION

In general, the present invention provides a method, system and program product for alerting an email user prior to any subsequent distribution of a received blind carbon-copied (BCC) email message. In accordance with the present invention, if a user who has received a BCC email message attempts to further distribute (e.g., forward, reply, reply-to-all, copy, print, and/or save, etc.) the received BCC email message, the user is alerted, for example via a display mechanism such as a pop-up window or the like, to the fact that they are about to distribute an email message on which they were blind carbon-copied.

A first aspect of the present invention provides a method for alerting a user prior to any subsequent distribution of a received blind carbon-copied (BCC) email message, comprising: determining if the user attempts to further distribute the received BCC email message; and alerting the user that the user is attempting to further distribute the received BCC email message.

A second aspect of the present invention provides a system for alerting a user prior to any subsequent distribution of a received blind carbon-copied (BCC) email message, comprising: a BCC distribution detection system for determining if the user attempts to further distribute the received BCC email message; and a user alert system for alerting the user that the user is attempting to further distribute the received BCC email message.

A third aspect of the present invention provides program product stored on a recordable medium for alerting a user prior to any subsequent distribution of a received blind carbon-copied (BCC) email message, which when executed comprises: program code for determining if the user attempts to further distribute the received BCC email message; and program code for alerting the user that the user is attempting to further distribute the received BCC email message.

Therefore, the present invention provides a method, system, and program product for alerting an email user prior to any subsequent distribution of a received blind carbon-copied (BCC) email message.

BRIEF DESCRIPTION OF THE DRAWINGS

These and other features of this invention will be more readily understood from the following detailed description of the various aspects of the invention taken in conjunction with the accompanying drawings in which.

Figure 1:
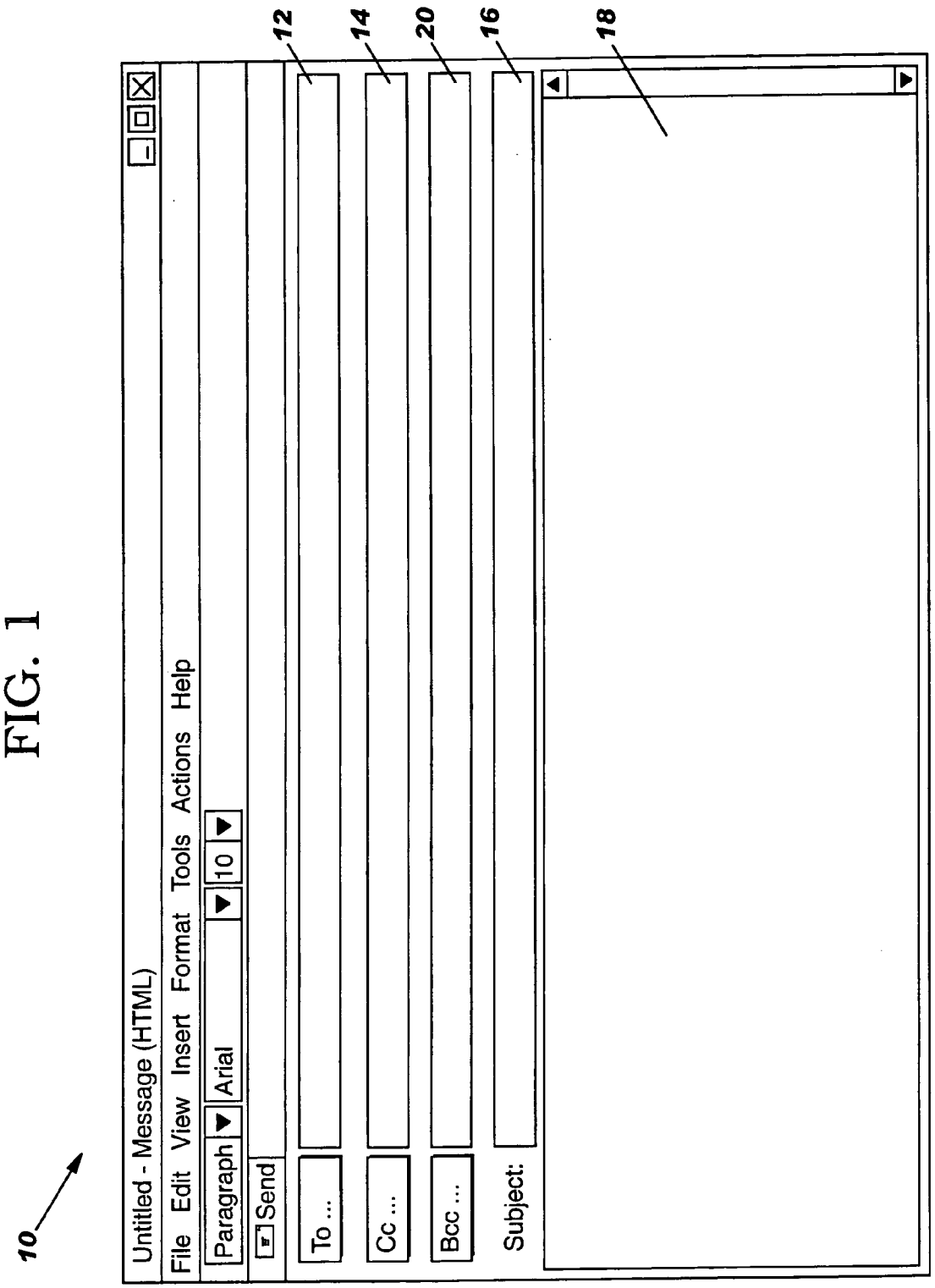
FIG. 1 depicts an exemplary email interface.

The drawings are merely schematic representations, not intended to portray specific parameters of the invention, and are not to scale. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system and program product for alerting an email user prior to any subsequent distribution of a received blind carbon-copied (BCC) email message. In accordance with the present invention, if a user who has received a BCC email message attempts to further distribute (e.g., forward, reply, reply-to-all, copy, print, and/or save, etc.) the received BCC email message, the user is alerted, for example via a display mechanism such as a pop-up window or the like, to the fact that they are about to distribute an email message that they were blind carbon-copied on.

When alerted, the user may also be presented with a list of options, instructions, comments, etc., on how to proceed regarding the further distribution of the received BCC email message. For example, the user may be instructed that the BCC email message should not be forwarded, that the original sender should be copied on BCC email message, if forwarded, or that the BCC email message may be forwarded without notifying the original sender, etc. Further, the user may be given the option, when they are alerted that they are attempting to further distribute a received BCC email message, to cancel or explicitly approve the intended action regarding the BCC email message. For example, a question such as "Do you really want to forward this BCC email message?" may be presented to the user. Many other options, instructions, comments, etc., may be also be provided without departing from the scope of the present invention as set forth in the accompanying claims.

Figure 2:
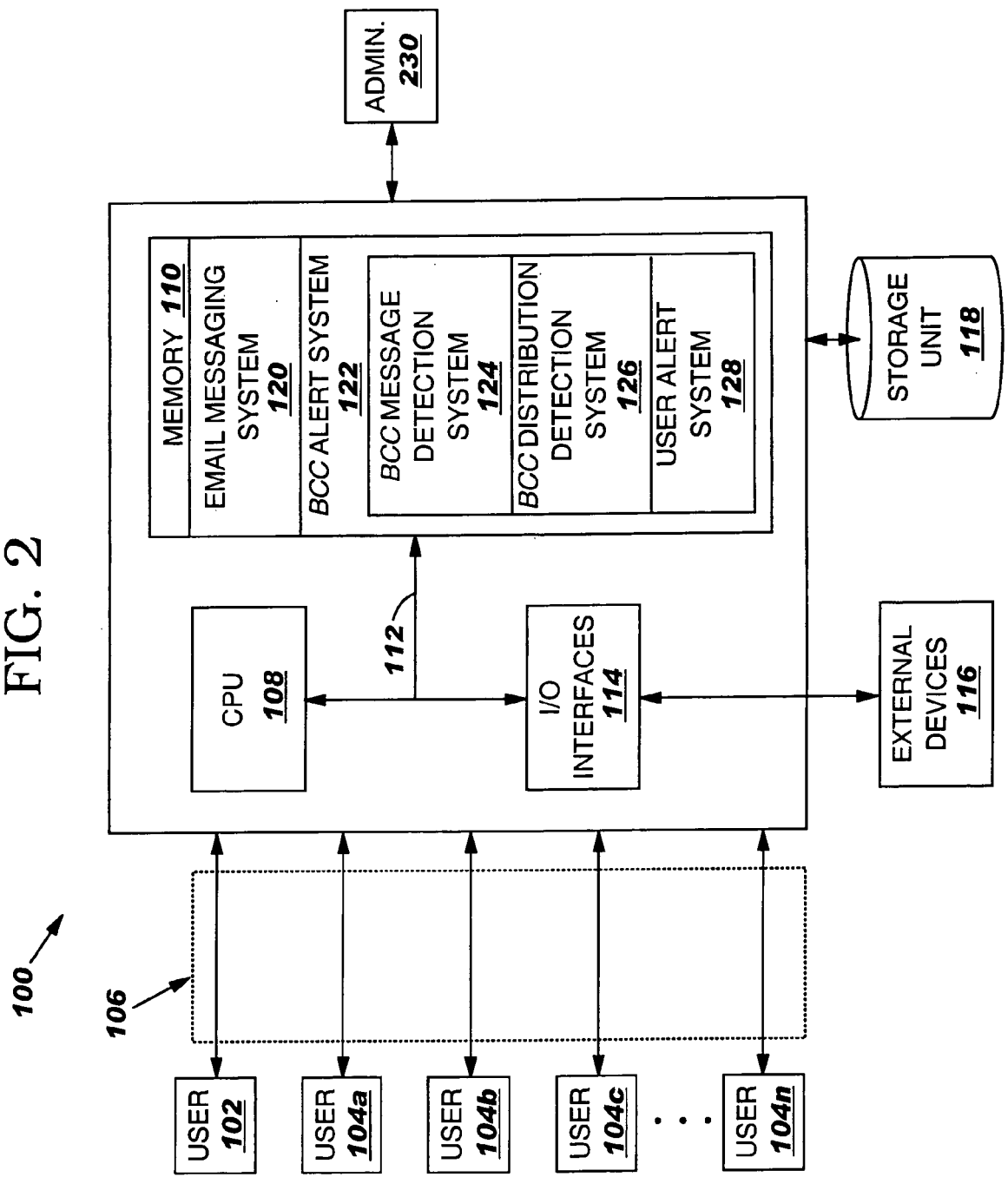
FIG. 2 depicts a computerized system for alerting an email user prior to any subsequent distribution of a received blind carbon-copied (BCC) email message in accordance with the present invention.

Referring now to FIG. 2, there is illustrated a computer system 100 for transmitting electronic communications in accordance with the present invention. Computer system 100 is intended to represent any type of computerized system that facilitates or enables the transmission of electronic communications, such as email messages, between a plurality of users. For example, computer system 100 may comprise an electronic mail server or the like. As will be presented in detail below, computer system 100 is configured in accordance with the present invention to alert a user that they are about to further distribute a received BCC message.

Computer system 100 allows a user 102 to transmit and receive email to/from other email-capable users 104 over a network 106. Each user 102, 104, employs a computerized system (e.g., laptop, personal computer, workstation, server, PDA, cellular phone, pager, etc.) that is capable of communicating with computer system 100 over network 106. Network 106 is intended to represent any type of network over which users 102, 104 can communicate with each other via computer system 100. For example, network 106 can include the Internet, a wide area network (WAN), a local area network (LAN), a virtual private network (VPN), a WiFi network, or other type of network. To this extent, communication can occur via a direct hardwired connection or via an addressable connection in a client-server (or server-server) environment that may utilize any combination of wireline and/or wireless transmission methods. In the case of the latter, the server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

As shown, computer system 100 generally includes a central processing unit (CPU) 108, memory 110, bus 112, input/output (I/O) interfaces 114 and external devices/resources 116. CPU 108 may comprise a single processing unit, or may be distributed across one or more processing units in one or more locations, e.g., on a client and server. Memory 110 may comprise any known type of data storage, including magnetic media, optical media, random access memory (RAM), read-only memory (ROM), etc. Moreover, similar to CPU 108, memory 110 may reside at a single physical location, comprising one or more types of data storage, or be distributed across a plurality of physical systems in various forms.

I/O interfaces 114 may comprise any system for exchanging information to/from an external source. External devices/resources 116 may comprise any known type of external device, including speakers, a CRT, LED screen, handheld device, keyboard, mouse, voice recognition system, speech output system, printer, monitor/display, facsimile, pager, etc.

Bus 112 provides a communication link between each of the components in computer system 100, and likewise may comprise any known type of transmission link, including electrical, optical, wireless, etc. In addition, although not shown, additional components, such as cache memory, communication systems, system software, etc., may be incorporated into computer system 100. It should be understood that the computerized systems employed by users 102, 104 typically include components (e.g., CPU, memory, etc.) similar to those described with regard to computer system 100.

Computer system 100 also includes a storage unit 118. Storage unit 118 can be any system capable of providing storage for information under the present invention. As such, storage unit 118 may reside at a single physical location, comprising one or more types of data storage, or may be distributed across a plurality of physical systems in various forms. In another embodiment, storage unit 118 may be distributed across, for example, a local area network (LAN), wide area network (WAN) or a storage area network (SAN) (not shown).

Shown in memory 110 is email messaging system 120, which can be any known or later developed system/program capable of providing email messaging capabilities. Also shown in memory 110 is a BCC alert system 122 for alerting user 102 prior to any subsequent distribution of a blind carbon-copied (BCC) email message received by user 102. As further shown in memory 110, BCC alert system 122 includes a BCC message detection system 124 for detecting the BCC status of a received email message, a BCC distribution detection system 126 for detecting when user 102 attempts to further distribute a received BCC email message, and a user alert system 128 for alerting user 102 (e.g., via a pop-up window) that he/she is attempting to further distribute a received BCC email message.

Figure 3:
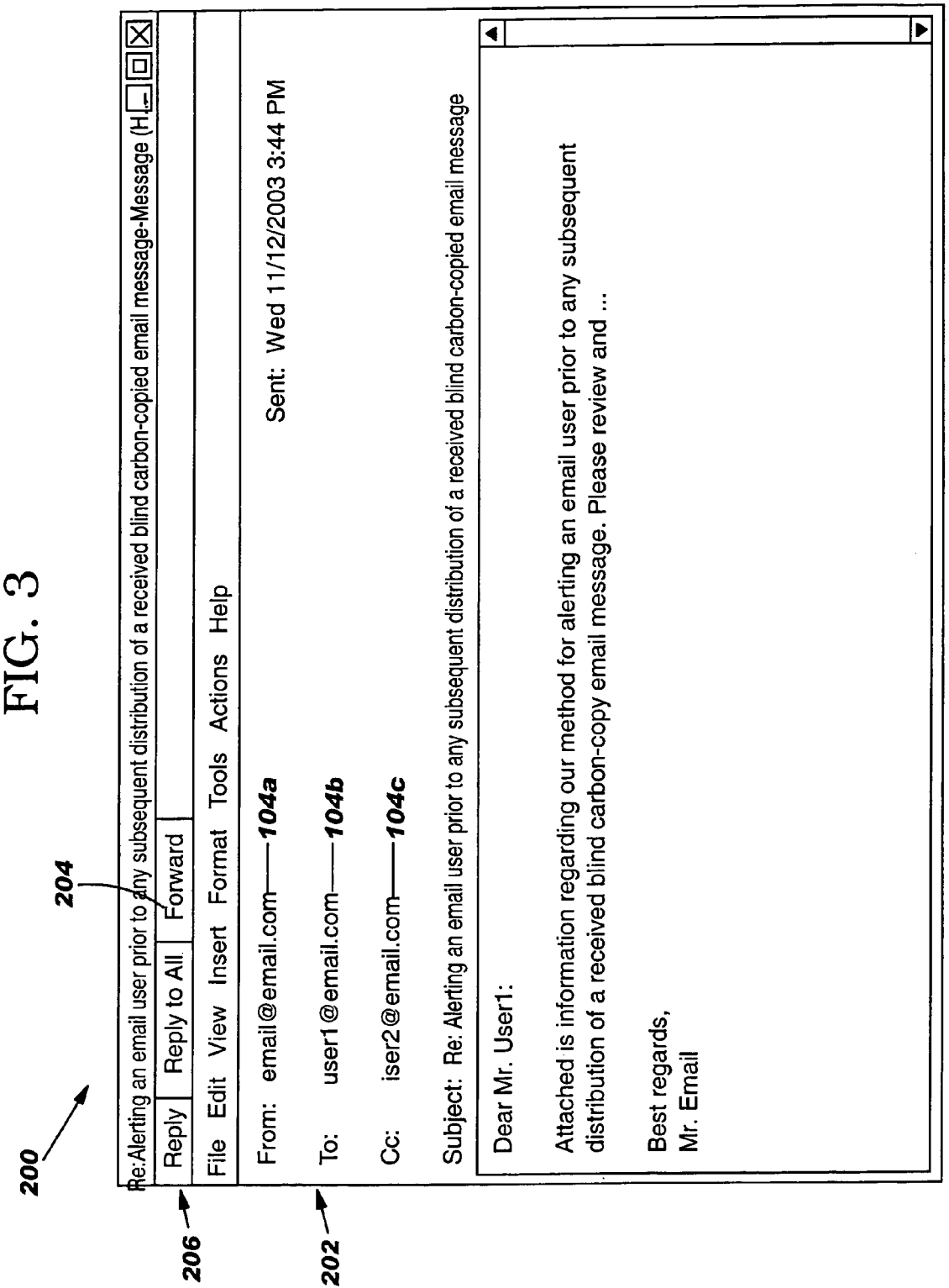
FIG. 3 depicts a received BCC email message.

Referring now to FIG. 3, let us assume that user 102 has received an email message 200 on which user 102 has been blind carbon-copied (BCC'd) on. The email message 200 was sent by a user 104*a* having an email address email@email.com. The email message 200 was sent to user 104*b* (i.e., user1@email.com), who was designated as a TO recipient, user 104*c* (i.e., user2.email.com), who was designated as a CC recipient), and user 102 (i.e., user3.email.com), who was designated as a BCC recipient. As such, the recipients designated through the use of TO and CC fields (i.e., users 104*b*, 104*c*), are identified to all other recipients of the email message 200, including user 102, via email message header 202, while users 104b and 104c are unaware that user 102 has received the same email message 200.

Now, let us assume that user 102 is not aware that he/she was designated as a BCC recipient of the email message 200 (e.g., user 102 did not carefully review the email message header 202 of the email message 200), and decides to forward the email message 200 to another user 104 by activating the forward button 204 in the menu bar 206 of the email message 200. The email message 200, however, was flagged as a received BCC email message by the BCC message detection system 124 of the BCC alert system 122 (FIG. 2). To this extent, BCC message detection system 124 is configured to examine the header information corresponding to the header 202 of the email message 200 to determine if user 102 was designated as either a TO or CC recipient of the email message 200 (i.e., to determine the BCC status of the email message 200). If no such designation is found, the BCC message detection system 124 flags the email message 200 as a received BCC email message (other techniques for flagging a BCC email message are also possible). This examination can take place, for example, upon receipt of an email message by user 102, or in response to an attempt by user 102 to further distribute a received email message. Upon activation of the forward button 204 by user 102 (or in response to any other type of attempted further distribution of the received BCC email message), the BCC distribution detection system 126 examines the BCC status of the email message 200 as determined by the BCC message detection system 124 and, if the email message 200 has been flagged as a received BCC email message, user alert system 128 is made aware of this fact.

Figure 4:
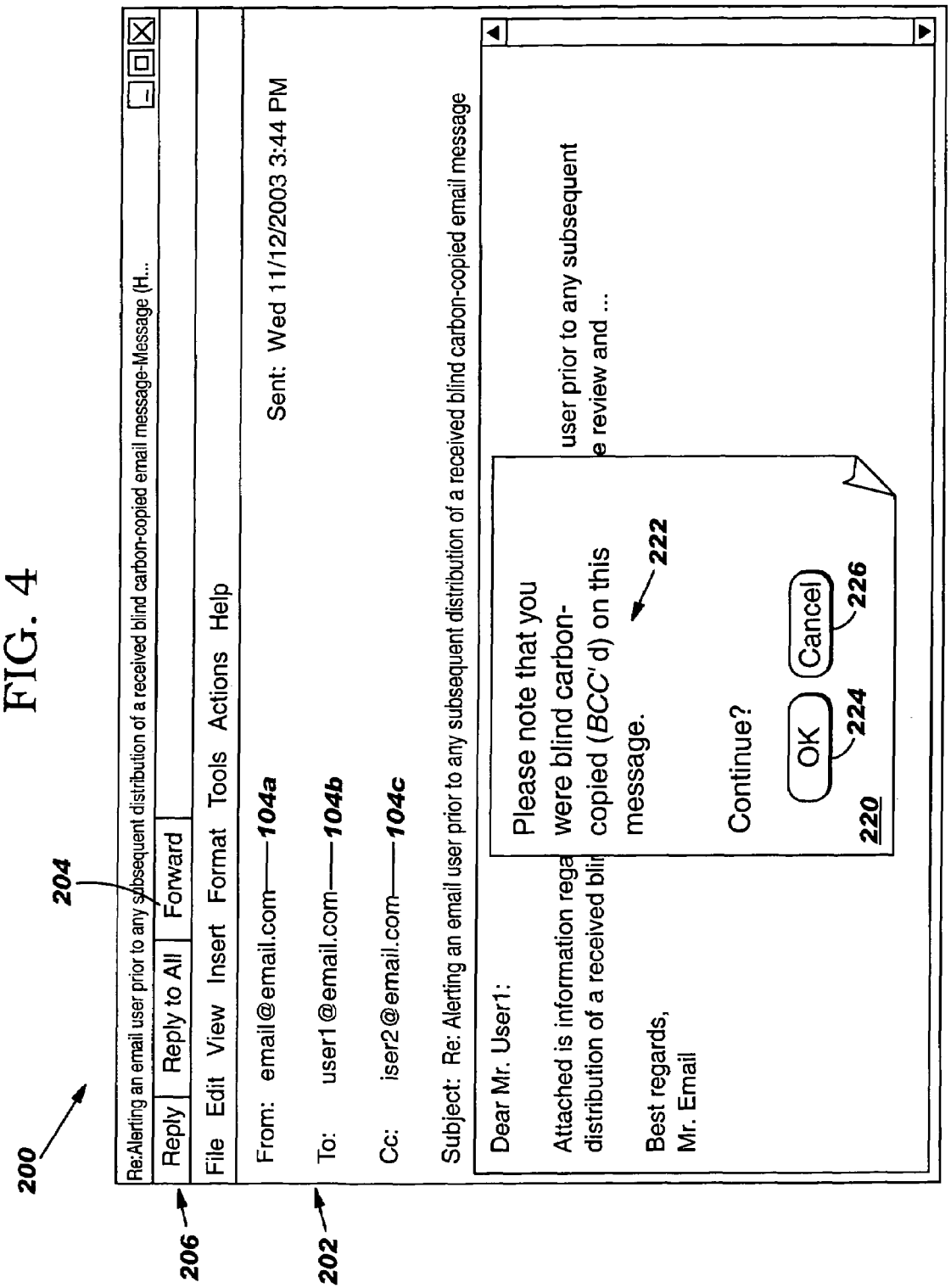
FIG. 4 depicts a pop-up window for alerting a user that he/she is attempting to further distribute a received BCC email message.

As shown in FIG. 4, user alert system 128 can then generate a display mechanism such as a pop-up window 220 or the like alerting user 102 that he/she is attempting to further distribute a received BCC email message. The pop-up window 220 may provide a message 222 such as "Please note that you were blind carbon-copied (BCC'd) on this message," or "Are you aware that you were blind carbon-copied (BCC'd) on this message?," etc. Alternatively, or in addition, the pop-up window 220 may provide instructions to user 102 such as "This received BCC email message should not be forwarded," "Please copy the original sender when forwarding this BCC email message," or "This BCC email message may be forwarded without notifying the original sender." Further, as shown in FIG. 4, the user may be given the option, when alerted that they are attempting to further distribute a received BCC email message, to explicitly approve or cancel the intended action regarding the BCC email message via buttons (or other selection mechanisms) 224, 226, respectively. As should be apparent to one skilled in the art, an endless variety of different messages, instructions, comments, questions, options, etc., may be presented to user 102 without departing from the scope of the invention as set forth in the accompanying claims. The specific alert message, type of alert, etc., can be set, for example, by user 102 or an administrator 230 (FIG. 2) of computer system 100 via a preference menu or the like. It should also be noted that other types of alerts may be provided by the user alert system 128 in response to an attempt to further distribute a received BCC email message. For example, an audio warning may be provided to the user 102. Many other types of alert mechanisms are also possible. Regardless of the type of alert used, in accordance with the present invention, user 102 will be made aware that he/she is attempting to further distribute a received BCC email message, and can respond accordingly.

It should be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

I claim:

1. A method for alerting a user prior to any subsequent distribution of a received blind carbon-copied (BCC) email message by the user, comprising:

receiving an email message;

determining if the user is designated as a BCC recipient of the email message; and, if it is determined that the user is designated as a BCC recipient of the email message:

determining if the user that received the BCC email message attempts to further distribute the received BCC email message;

alerting the user that the user is attempting to further distribute the received BCC email message; and requiring the user to explicitly provide permission before the received BCC email message can be distributed further.

2. The method of claim 1, wherein further distributing the received BCC email message is selected from the group consisting of: forward, reply, reply-to-all, copy, print, and save.

3. The method of claim 1, wherein alerting the user that the user is attempting to further distribute the received BCC email message further comprises:

providing a display mechanism containing information informing the user that that the user is about to distribute the received BCC email message.

4. The method of claim 3, wherein the display mechanism comprises a pop-up window.

5. The method of claim 3, wherein the information informing the user that the user is about to distribute the received BCC email message is selected from the group consisting of: a message, instruction, comment, question, and action option.

6. The method of claim 1, wherein requiring the user to explicitly provide permission further comprises:

requiring the user to actuate a selection mechanism for approving the further distribution of the received BCC email message.

7. A system for alerting a user prior to any subsequent distribution of a received blind carbon-copied (BCC) email message by the user, comprising:
- a system for receiving an email message;
- a BCC message detection system for determining if the user is designated as a BCC recipient of the email message;
- a BCC distribution detection system for determining if the user that received the BCC email message attempts to further distribute the received BCC email message, if it is determined by the BCC message detection system that the user is designated as a BCC recipient of the email message;
- a user alert system for alerting the user that the user is attempting to further distribute the received BCC email message; and
- a selection mechanism that must be actuated by the user to provide permission for the further distribution of the received BCC email message.

8. The system of claim 7, wherein further distributing the received BCC email message is selected from the group consisting of: forward, reply, reply-to-all, copy, print, and save.

9. The system of claim 7, wherein the user alert system is configured to provide a display mechanism containing information informing the user that the user is about to distribute the received BCC email message.

10. The system of claim 9, wherein the display mechanism comprises a pop-up window.

11. The system of claim 9, wherein the information informing the user that the user is about to distribute the received BCC email message is selected from the group consisting of: a message, instruction, comment, question, and action option.

12. A program product, comprising a computer recordable medium, having stored there on program code, which when executed on a computer system, alerts a user prior to any subsequent distribution of a received blind carbon-copied (BCC) email message by the user, the computer program code comprising:
- receiving an email message;
- determining if the user is designated as a BCC recipient of the email message; and,
- if it is determined that the user is designated as a BCC recipient of the email message:
- determining if the user that received the BCC email message attempts to further distribute the received BCC email message;
- alerting the user that the user is attempting to further distribute the received BCC email message; and
- requiring the user to explicitly provide permission before the received BCC email message can be distributed further.

13. The program product of claim 12, wherein further distributing the received BCC email message is selected from the group consisting of: forward, reply, reply-to-all, copy, print, and save.

14. The program product of claim 12, wherein alerting the user that the user is attempting to further distribute the received BCC email message further comprises:
- providing a display mechanism containing information informing the user that that the user is about to distribute the received BCC email message.

15. The program product of claim 14, wherein the display mechanism comprises a pop-up window.

16. The program product of claim 14, wherein the information informing the user that the user is about to distribute the received BCC email message is selected from the group consisting of: a message, instruction, comment, question, and action option.

17. The program product of claim 12, wherein requiring the user to explicitly provide permission further comprises:
- requiring the user to actuate a selection mechanism for approving the further distribution of the received BCC email message.

* * * * *